FIG_2

FIG_3

FIG_4

Inventor
WILLIAM A. SOURWINE & HERBERT I. PIERCE JR.

By Smith & Tuck
Attorneys

FIG_5A

Patented Sept. 6, 1949

2,481,169

UNITED STATES PATENT OFFICE 2,481,169

ELECTRIC SELF-INDICATING INDEXING AND SWITCHING SYSTEM

William A. Sourwine and Herbert I. Pierce, Seattle, Wash.

Application July 30, 1947, Serial No. 764,606

8 Claims. (Cl. 177—353)

Our invention relates broadly to listing devices or registering means, and more specifically, to an electric self-indicating indexing and switching system.

Posting or cataloging two dimensional information refers to any system of records wherein the condition, location, or category of an individual item, or group of items, is registered in such a way that one may easily determine in which specific category a particular item has been placed or which specific items have been placed in a particular category or location.

An example of such a system would be a dispatching board for a taxi-cab fleet, wherein a series of vertical columns would individually represent a district within the area served, while a series of horizontal columns intersecting the vertical columns would individually represent a taxi-cab of the fleet. Holes in the board for receiving appropriate pegs at all intersections of horizontal and vertical columns would allow a dispatcher to keep a record of each cab and its location by placing a peg in the proper hole. With such a visual record before him, a dispatcher could see in which location a particular cab had been reported last, or he could also see which cabs had reported from a particular location or district. This type of registry, with slight variations, has been used in many lines of business, in spite of its shortcomings. Heretofore, this type of work was performed laboriously and under conditions conducive to inaccuracies and loss of time, using inferior methods and means.

An object of the invention is to simplify and expedite the performance of the procedure outlined above.

Another object of the invention is to provide a method and means for the accomplishment of the process stated, whereby the operator may be an unskilled worker not required to memorize a registry board nor to have any particular training or skill; and whereby employees having other duties could aid in maintaining such a registry.

Another object is to increase efficiency and to eliminate fatigue in an operator performing the procedure mentioned, it being unnecessary for the operator to devote his attention to a large area or to undergo undue stretching and activity, or be subject to severe eye strain in the performance of his duties.

A further object of the invention is to provide an electro-mechanical registry means of the character mentioned which is automatic and rapid in its operation, so that the possibility of inaccuracies is practically eliminated while, at the same time, the functions of storing information therein, or recovering stored information for review, are accomplished with rapidity, and with much less effort than was heretofore necessary.

Another object of this invention is the provision of electro-mechanical means for storing information wherein the stored information would be unaffected by power failure.

Another object of this invention is the provision of a method and means for storing two dimensional information such as recording the presence of specific items in specific locations.

Another object of the invention is to provide a method and equipment for displaying and reviewing two dimensional information stored therein.

A further object of the invention is to provide electro-mechanical cataloging means wherein stored information may be readily revised or corrected.

Further objects and applications of the invention will become apparent upon consideration of the specification and drawings of this disclosure, in which:

Figures 2, 3, and 4 collectively represent a simplified form of the invention.

Figs. 5A and 5B when laid side by side with Fig. 5A on the left represent the complete wiring diagram exclusive of the power supply for a 3 x 4 dispatching unit embodying this invention; 3 x 4 refers to provision for 3 taxicabs which may be variously disposed in 4 locations or categories. In the dashed enclosure designated "cabs" are to be found 3 push-buttons, each representing one of the taxicabs cataloged by this registry board. These push-buttons are designated respectively 1CB, 2CB, and 3CB. Directly under these buttons and also within the dashed enclosure are to be found the indicator lamps for the corresponding taxicabs or items. Within the dashed enclosure designated "locations" are to be found similar buttons and indicating lamps except that in this latter case said buttons and lamps relate to locations or zones wherein any of the cabs or items may be located. In addition the "light test" switch or push-button, the "clear" button, and the "out" button, and their corresponding indicating lamps are shown in their individual dashed enclosures. In Fig. 5B the 3 "map board" lamps A, B, C, are shown in their dashed enclosure. Together the above mentioned dashed enclosures and their apparatus represent the entire display means and control means for this 3 x 4 installation. Information storage is accomplished by the relative positions of the cab step switches shown enclosed in dashed lines in Figs. 5A and 5B. All other components shown are necessary adjuncts to accomplish the desired functions and features of this registry system.

General description

The customary method is used in assigning letters to a relay coil and similar letters, plus a number, to the contacts actuated by said coil. In addition, to aid in tracing the various operations and their sequence, an additional number has been added in parenthesis to the letters designating each relay coil, said number in parenthesis indicating the total number of pairs of contacts actuated by said relay coil. For example, relay coil KR(1) actuates only one pair of contacts. Therefore, upon finding that one pair of contacts, KR1, and determining its function, no further searching is necessary. Referring to the symbols designating the stepping switches, the first character indicates the number of the switch. The next two letters, SS, mark it as a stepping switch, and the last two characters indicate the particular deck of switch points to which attention is being directed. For example, 2SS3D indicates the third deck of the number 2 stepping switch.

In general, this method of electro-mechanical posting or registering consists of four operations. The first of these is the registration or recording of the available information in the equipments. Clearance is another operation to remove all visual indications of having recorded the information without disturbing the storage of that information within the apparatus. The third and fourth operations are two forms of interrogation. The first form of interrogation consists of asking the location or in what category a certain item has been placed. The second form of interrogation consists of asking which items have been placed in a specific category or location. When it becomes necessary to make an alteration or revision of the information which has been previously recorded, the operator merely uses the registration operation. After each operation has served its useful purpose, it should be followed by a clearance operation in order to remove all visual indications, thereby preparing the equipment for the next registration or interrogation.

Figure 1:
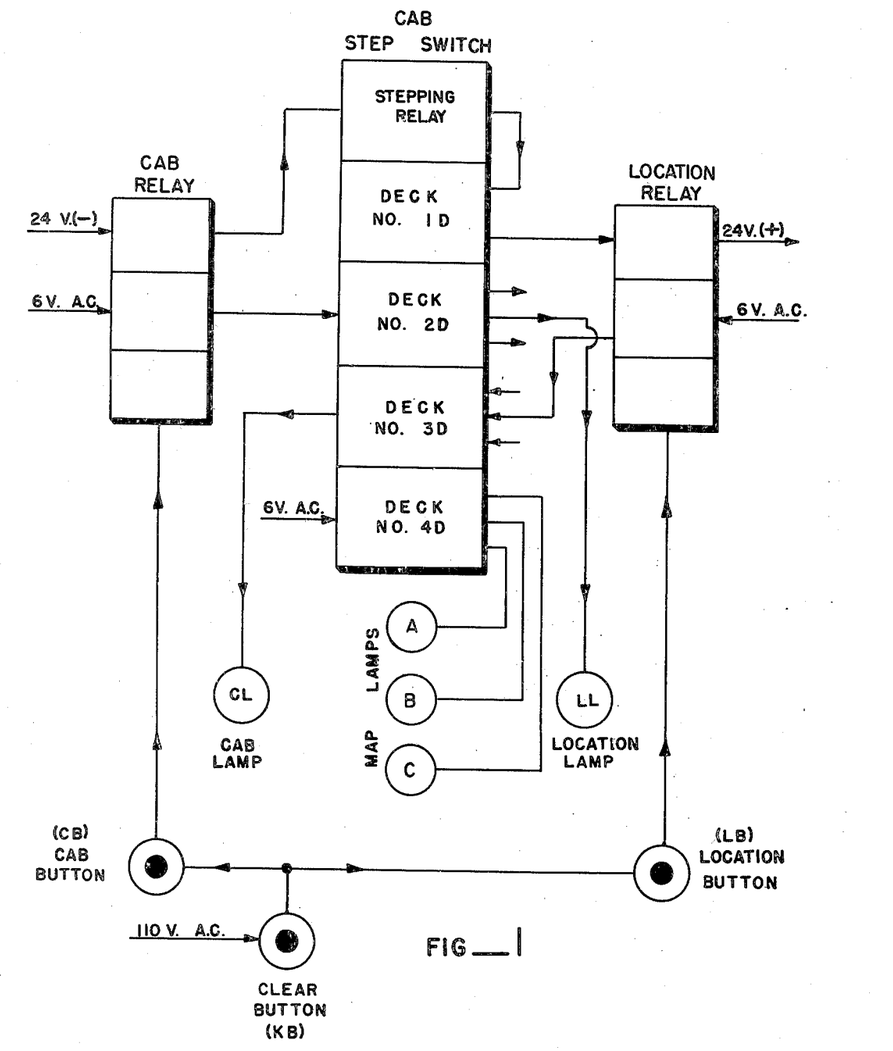
Fig. 1 is a block diagram delineating the basic operation and interrelation of components in a particular embodiment of this invention as applied to the dispatching of taxi-cabs.

Fig. 1 is a block diagram delineating the basic operation of one particular embodiment of this invention as applied to the dispatching of taxicabs. It is assumed, for demonstration of this particular application of the invention, that the city or area served by a group of taxi-cabs is divided into a number of districts or locations. There may also be a plurality of conditions of a cab such as "out of service," "in use," or others which make the cab unavailable for immediate use. In this example, the one condition "out of service" has been deemed sufficient for demonstrating the idea and is designated for simplification as "out." The various locations, where a cab may be, have been designated as "A," "B," and "C." Various cabs are designated numerically as 1C, 2C, and 3C. For engineering reasons, three different sources of voltage have been used in a demonstration model of this invention designed for dispatching taxi-cabs; therefore, this and other features of the demonstration model will be used in this patent application for illustrative purposes only and not in a limiting sense.

Referring to Fig. 1, the registration or recording operation consists of depressing both the cab button CB and the location button LB at approximately the same time. Or, they may be individually pressed in either sequence. Upon so doing, the 110 volt A. C. through the cab button CB actuates the cab relay and closes its contacts. This action applies 6 volts A. C. to the switch arm of deck No. 2 in the cab step switch. The various switch points distribute the 6 volts A. C. from deck 2D to the various "location" or "condition" lamps, there being a number of switch points or positions at least equal to the number of locations plus conditions. In addition, 24 volts D. C. is applied, by the actuation of the cab relay, to the stepping relay portion and deck No. 1D of the cab step switch. The number of switch points in each deck is similar to deck 2D. Upon actuation of the location relay, the D. C. circuit for the operation of the stepping relay is completed and, as a result, said stepping relay will rotate until it finds the switch point in deck No. 1D which corresponds to the location represented by the location button or relay which initiated its operation. As a result of this operation, the switch arm of each of the four decks has come to rest on a switch point corresponding to the location or condition of the cab represented by the step switch as a whole. An additional result of the actuation of the location relay was to place 6 volts A. C. on the switch point on deck 3D which now has the contact arm in contact with it, thus applying the 6 volts A. C. to the cab lamp CL. As a result of the above, both the location lamp and the cab lamp are now illuminated, indicating the particular location in which a particular cab has been registered by the above operation. In addition, through deck No. 4D, the 6 volts A. C. has also been applied to the appropriate map lamp indicating that the specific location or district involved in the registration of the above information has at least one cab therein. Now that registration of the information has been completed by the rotation of the cab switch to the selected location point, it is necessary to clear the location and cab relays by pressing the clearing button shown in Fig. 1. As a result of clearing, the cab and location lamps will be extinguished, but the map lamp will remain lighted and the cab step switch will remain in its position thus retaining the information posted there.

Interrogation as to the location or condition of a cab may now be accomplished by merely pressing a cab button CB. The cab relay thus activated applies the negative of the 24 volts D. C. to the stepping relay of the cab step switch but, since the location relay has not been actuated, the cab step switch cannot rotate. Hence, the information previously recorded in the step switch is unaffected. A further result of the actuation of the cab relay applies the 6 volts A. C. to the switch arm of deck No. 2D, which delivers it to the appropriate location lamp LL, thus indicating the position of the cab. In other words, it has answered the question. After pressing the clearance button as before, the lamp LL is extinguished as a result of de-energizing the cab relay, thus opening its contacts.

In the second form of interrogation as to what cab or cabs are in a certain area or location, the operator merely presses the location button LB, thus actuating the location relay. As before, the 24 volts D. C. is applied to the stepping relay and deck No. ID but, since the cab relay is not actuated, the circuit is open and therefore the cab step switch remains quiescent. The 6 volts A. C., however, has been applied by the location relay to the appropriate location switch point on deck No. 3D and the switch arm of said deck connects it to the cab light CL thus illuminating same and answering the question. Pressing of the clearance button will again drop out the location relay and extinguish the cab lamp CL, thus clearing the lamps for later questioning.

Figure 1 shows a system involving only one cab and one location for simplicity. In a system involving a plurality of both cabs and locations or conditions, there would be a multiplicity of the units shown. For example, for each cab there would be a cab button CB, a cab light CL, a cab relay, and a cab step switch. For each location there would be a location button LB, a location lamp LL, a location relay, and a switch point or position on each deck of the cab step switch. All corresponding switch points of corresponding decks of the step switches would be interconnected. In addition, there would be various interlocking and interrelated circuits shown in greater detail in the other figures of this patent application.

*Operation*

Figure 2:
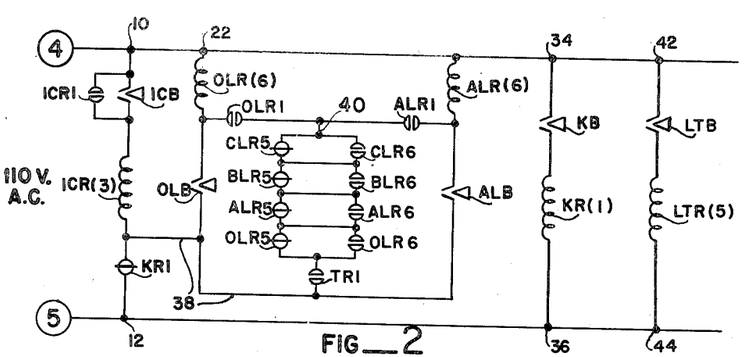
Fig. 2 shows the main leads connected to the terminals 4 and 5, corresponding to similar leads connected to similarly numbered terminals in Figs. 5A and 5B which distribute 110 volts A. C. throughout the equipment. At least one type of each basic control circuit necessary to show the operation of this invention, is included in Fig. 2.
Figure 3:
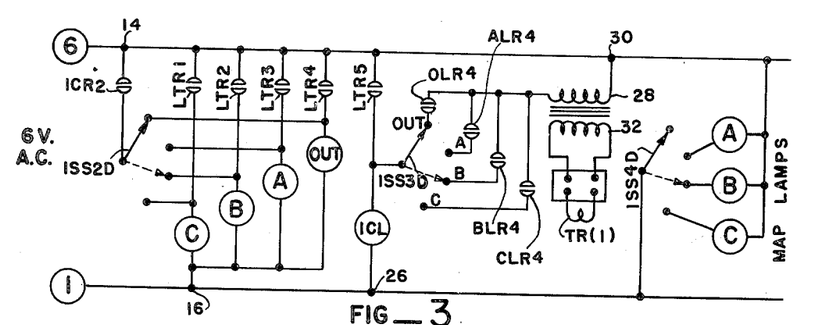
Fig. 3 shows the two main leads connected to the terminals 1 and 6, corresponding to similar leads connected to similarly numbered terminals in Figs. 5A and 5B which distribute 6 volts A. C. throughout the equipment. At least one of each type of basic indicating and test circuit necessary to explain the operation of this invention is included in Fig. 3.
Figure 4:
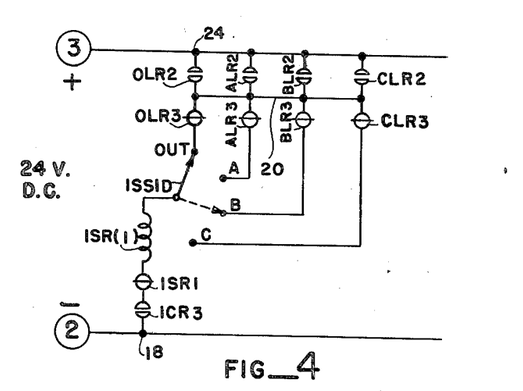
Fig. 4 shows the two main leads connected to the terminals 2 and 3 corresponding to similar leads connected to similarly numbered terminals in Figs. 5A and 5B which distribute 24 volts D. C. throughout the equipment. At least one of each type of basic actuating or impulsing circuit necessary to explain the operation of this invention is included in Fig. 4.
Figure 5A:
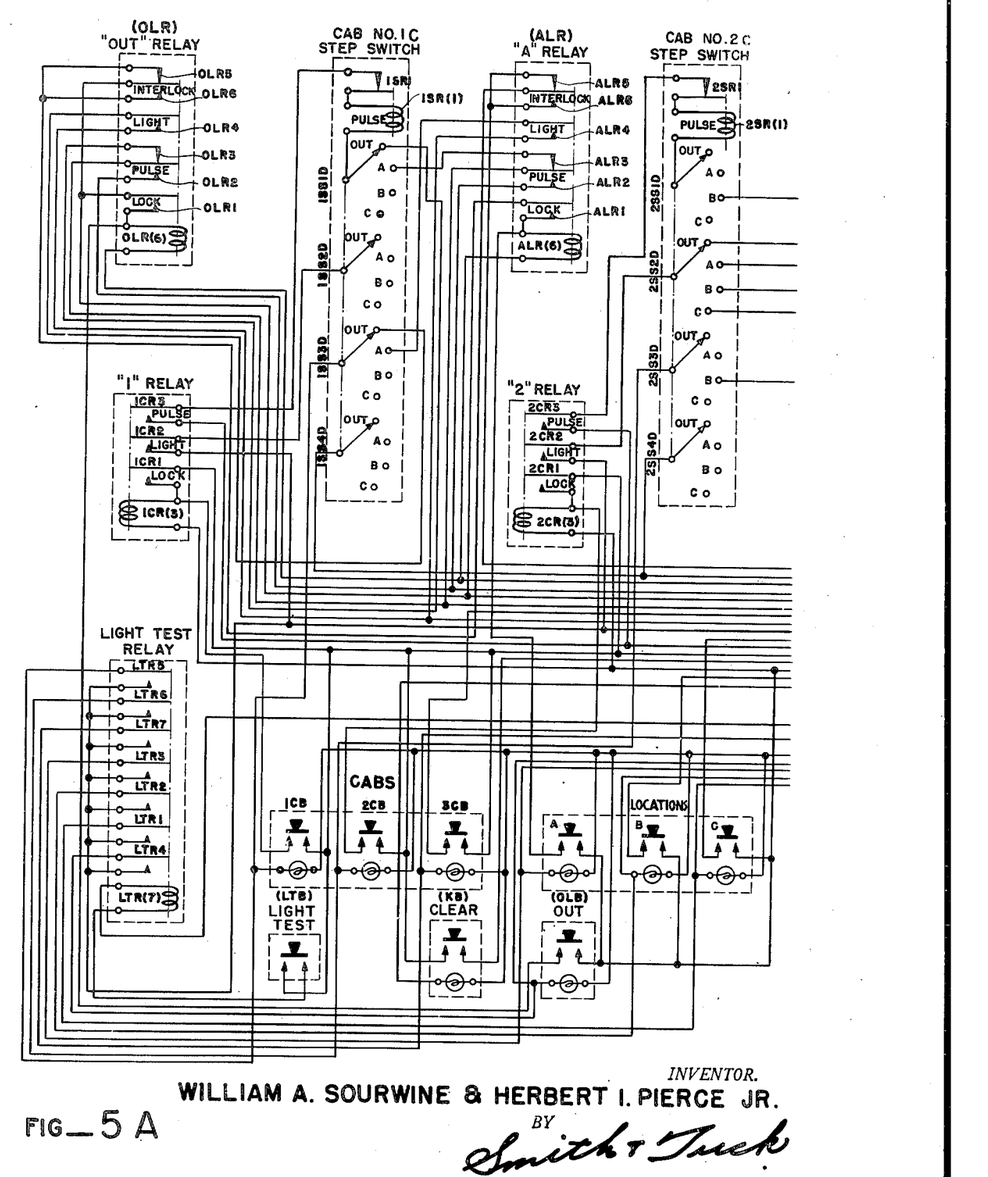
Figure 5B:
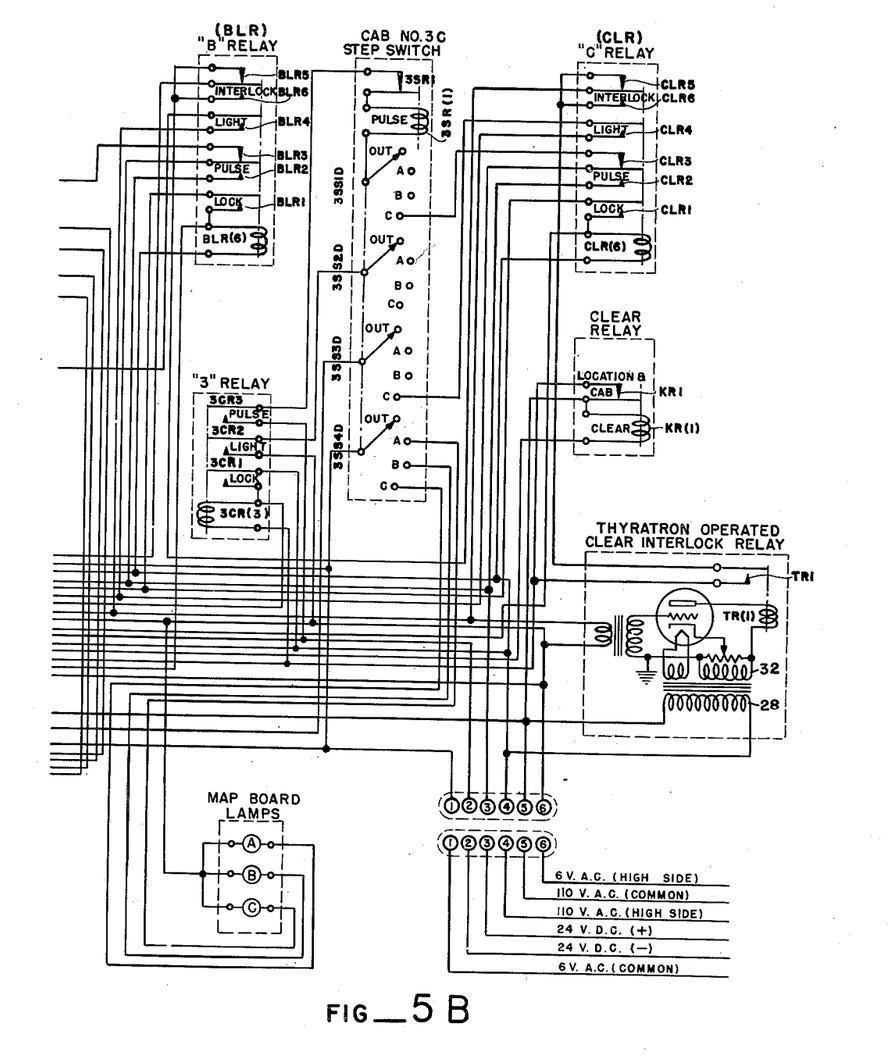

Referring to Figures 2, 3 and 4, a numbering and lettering code has been used to designate the relay coils and the contacts associated therewith, also the number of contacts. For example, the No. 1 cab relay coil which has three pairs of contacts is designated by the symbol ICR(3). The first pair of contacts on this relay, which is shown nearest the relay coil in Fig. 5A, is designated by the symbol ICR1, in Fig. 2. The code explained elsewhere will aid in applying the symbols to the proper piece of apparatus.

Referring to Fig. 2, a registration operation consists of depressing a "cab" or "item" button and a "location" or "category" button. Assuming the No. 1 cab button, or switch key, ICB to be depressed first, a circuit is completed from the point 10 on the conductor 4, through said button, the No. 1 cab relay coil ICR(3), and the clearing relay contacts KR1, which are normally closed to the point 12 on conductor 5. The relay coil ICR(3) actuates its three pairs of contacts, and upon closing its first pair of normally open contacts ICR1 in parallel to the cab button ICB the circuit is "locked-in," thereby remaining closed even though the cab button ICB is released. In addition, the second pair of No. 1 cab relay contacts ICR2, which are normally open, have thus been closed, thereby completing a circuit from point 14 on conductor 6 in Fig. 3, through the No. 1 stepping switch, second deck, designated by ISS2D, then through the "category" or "location" lamp B to the point 16 on conductor 1. It is assumed for the moment that some previous operation has left the stepping switch in the B position, as shown in dotted lines in Figs. 3 and 4. The third pair of normally open contacts on No. 1 cab relay, said contacts being designated ICR3 in Fig. 4, upon closing completes a circuit from point 18 through the normally closed contacts ISR1 of the No. 1 stepping relay, through No. 1 stepping relay coil ISR(1), and through the first deck of the first stepping switch ISS1D to point B, through the normally closed contacts BLR3 of the B location relay, to the common lead 20, beyond which the circuit remains open insofar as the cab relay and its circuits are concerned. Depressing the "out" location button OLB in Fig. 2 completes a circuit from point 12 on conductor 5, through the normally closed contacts KR1, through said button OLB and the "out" location relay coil OLR(6) to the point 22 on conductor 4. Upon being thus actuated, the "out" location relay closes its normally open contacts OLR1 and OLR6 in Fig. 2; however, before closing OLR6, the normally closed contacts OLR5 are opened to momentarily interrupt any current which may be flowing in their associated circuits. In addition contacts OLR4, which are normally open contacts, Fig. 3, have now been closed. In Fig. 4, the normally open contacts OLR2 have thus been closed and the normally closed contacts OLR3 have been opened, thereby connecting the common lead 20 to the conductor 3 at point 24 and disconnecting the "out" switch point from the common lead 20. The actuating circuit for the stepping relay ISR(1) has now been completed, and it will be noted that all switch points of the stepping switch ISS1D are connected to the positive side or No. 3 conductor of the D. C. circuit except the "out" switch point, which was disconnected from the common lead 20 by the opening of the normally closed contacts OLR3. As a result, the pulsing or stepping relay ISR(1) will rotate the four selecting switches ISS1D, ISS2D, ISS3D, and ISS4D until the switch arm ISS1D stops on the switch point "out," by virtue of its being the only "dead" point of the group. The four selective switches which, in combination, form the memorizing mechanism for cab or item No. 1C, have "memorized" the fact that cab No. 1C is now "out of service," the several switch arms being in the locations shown in solid lines. As a result of this circuit re-arrangement, the B location lamp, or other indicating means in Fig. 3, has been de-energized and the "out" lamp has been connected between the conductors 6 and 1 at the points 14 and 16, respectively. In addition, the circuit from point 26, Fig. 3, through the cab indicating lamp No. 1CL, the switch arm, contact OLR4, and the transformer primary 28, to the point 30 on conductor 6 has been completed. The current supplying the indicating means for cab No. 1C, when passing through the primary 28 of the transformer produces a voltage in the secondary 32, which reacts upon a thyratron tube causing it to ionize and actuate a relay in its plate circuit. The thyratron actuated relay coil in Fig. 3 is indicated as TR(1) and has one pair of normally open contacts shown in Fig. 2 as TR1. These contacts, upon closing, complete the circuit shunting the "out" location button OLB, thus locking in the "out" location relay OLR(6).

The clearing operation consists of removing all indications displayed by the indicating means, other than the "map" lamps which at all times indicate those districts of the city or categories which have at least one cab or item registered therein. To accomplish such clearance, the clearing button KB is depressed, thus completing the circuit from point 34 to point 36 on conductors 4 and 5, respectively, in Fig. 2. The clearing relay coil KR(1) thus energized opens its normally closed contacts KR1 and thereby disconnects all control circuits which are connected to conductor 5 at point 12. This restores all of the No. 1 cab relay contacts and the "out" location relay contacts to their normal condition, as indicated by conventional symbols in Figs. 2, 3, and 4. Consequently, all indicating lamps are extinguished. The cab stepping switch, however, remains unaffected, hence it continues to "remember" that when last "advised" cab No. 1C was placed in the "out of service" category, and this setting cannot be changed except by pressing the No. 1 cab button 1CB and some location button other than the "out" button OLB, which would constitute a new posting or registration operation.

Referring again to Fig. 2, an interrogation operation as to the condition or location of No. 1 cab, or in what category a certain item has been placed, consists of pressing the cab button 1CB. This action completes the circuit as before between the points 10 and 12 on the conductors 4 and 5, respectively, and the cab relay 1CR(3) closes its three normally open contacts. Again the contacts 1CR1 lock in the relay control circuit, and contacts 1CR2 close the indicating circuit between the points 14 and 16 in Fig. 3, thus illuminating the "out" lamp, thereby answering the question with the response that No. 1 cab is "out of service." Since the location relay OLR(6) was not energized in the above operation, the actuating circuits in Fig. 4 remained quiescent. Pressing the clearing button KB again clears the indicating means and prepares the equipment for further questioning.

Referring to Fig. 2, the second type of interrogation as to which cabs or items have been placed in a particular location, or category, consists of pressing the particular location button such as the "out" button OLB in Fig. 2. As before, the circuit is thus completed between the points 12 and 22, thereby energizing the location relay OLR(6) and actuating its contacts. The contacts OLR1, OLR2, OLR4, and OLR6 have now been closed and contacts OLR3 and OLR5 have been opened. As a result, the indicating circuit between the points 26 and 30 in Fig. 3 has been closed, thereby illuminating the cab lamp 1CL, thus answering the question with the response that the "out" category has No. 1 cab posted therein. Since the cab relay 1CR(3) was not energized in the above operation, the actuating circuits in Fig. 4 remained quiescent. As before, the indicating means may now be cleared of indications by means of the clearing button KB.

Although the above examples of operation have taken account of only single cab-and-location relays and their attendant contacts, this system may obviously be expanded to include any number of each. Upon doing this, the necessity and functions of the various interlocking circuits become more apparent and will be described below. Additional cab relay control circuits, including the cab buttons and lock-in contacts, would be connected between the conductors 4 and 38 in Fig. 2. An additional location relay ALR(6), its control button or switch ALB, and lock-in contacts ALR1 are shown connected between conductors 4 and 38, and also to the interlock conductor 40. Any additional location or category relays and their attendant control buttons and lock-in contacts would be similarly connected. Additional stepping relays and their attendant switch arms would all be independent circuits connected through their appropriate contacts to the main power supply conductors. However, all corresponding switch points of corresponding decks in the stepping switches would be interconnected.

As a result of these interconnections, all cab indicating lamps representing cabs which had been registered in the same location would be simultaneously illuminated upon pressing the corresponding location button to interrogate the equipment as to which cabs were posted in that location or category.

Another result of the interconnections above mentioned is that any given location lamp may be illuminated from any one of the second decks of the stepping switches, provided the switch arm is in contact with the appropriate switch point when the equipment is interrogated by pressing the cab button corresponding to said switch arm.

A further result of the above interconnections is that upon pressing a location button or switch, all switch points on all of the first decks of the stepping switches are energized, except the one point on each of said first decks which corresponds to the location switch which has been closed. Thus one half of each actuating circuit has been electrically preconditioned, so that upon closure of the third pair of contacts of any cab relay, by closing the cab switch button, actuation of the corresponding stepping switch will result.

The final result of these interconnections between corresponding decks is to provide each of the map lamps with a switch point, located in its appropriate position, in every one of the fourth decks of all stepping switches. Hence, any given map lamp will remain illuminated as long as there is at least one switch arm in contact with its switch point on any deck.

The complexity of the lock-in circuit, shunting the location buttons or switches, is necessary for two reasons. First, it would be undesirable for a location relay to be locked into the circuit, if there were no cabs in that location and hence no visual response from the indicating means. To prevent such undesirable operation, a link circuit or the "clear interlock relay" was developed. This includes the transformer primary 28 and secondary 32, a thyratron tube and a relay actuated by said tube, as previously described. Briefly, if one or more cab lamps draw current through the current transformer 28, the net result will be the closure of the contacts TR1, thus accomplishing the lock-in feature. In the absence of any current through the primary 28, as a result of no cabs being posted in that location, the contacts TR1 would remain open, thus preventing the lock-in feature. The second undesirable feature to be avoided would be the locking-in of two or more location relays, simultaneously. To prevent this, each location relay has two pairs of contacts connected somewhat as a single-pole double-throw switch, for example the contacts OLR5 and OLR6. Whenever a location relay is actuated, the normally closed pair of contacts in this combination is opened, following which the normally open contacts are closed. Such a momentary interruption of the lock-in circuit will cause all other location relays to drop out of the circuit except the one being actuated by its corresponding switch button.

Since reliable functioning of the equipment is dependent upon indicating means performing properly at all times, it was deemed necessary to incorporate testing means for verifying the operation of all indicating units, except the map lamps. This has been accomplished by the control circuit shown between the points 42 and 44 on the conductors 4 and 5, respectively. This circuit includes the light-test switch button LTB, in series with the light-test relay LTR(5). The number of pairs of contacts on the light-test relay LTR is equal to the total number of cabs plus the total number of locations or conditions, and are shown in Fig. 3, where indicated. When these normally open contacts are closed, as a result of closing the light-test switch button LTB, each of the cab and location indicating units are connected across the conductors 1 and 6, thereby causing all of them to be actuated or illuminated, unless defective.

The basic idea involved in this invention may be applied to a variety of applications with but slight modifications to the preferred embodiment disclosed in this patent application. To those versed in the art it will be obvious that a series of sequence relays could be used to store information having two dimensions in a manner similar to the stepping relays discussed herein. Although present equipment demonstrating the principles involved in this invention incorporates practically all of the various apparatus described above, other equipment using the same principles is being contemplated but using sequence relays and other varieties of apparatus different from that disclosed above.

Other variations for simplification might involve the removal of all interlocks and locking-in features, which would also remove the necessity of a clearing button, its relay and attendant circuits. In such an arrangement, it would then be necessary to hold down the cab button or location button continuously, while studying the response given by the indicating units, because upon release of said cab button, or location button, all circuits would revert to normal. To post information in such equipment, it would be necessary to continuously depress both a cab button and a location button at the same time, until the stepping relays had come to rest in the appropriate position. For some applications the mere saving of weight resulting from such simplification might be a marked advantage; however, such equipment would still be employing the basic principles disclosed herein. In addition, the bank of map lamps and the lamp testing circuits and apparatus could be eliminated, if the services afforded by them were not of paramount importance. In the demonstration equipment, a current operated relay is used in place of the transformer primary 28 and directly actuates a pair of contacts corresponding to the contacts TR1, thus dispensing with the thyratron tube and its attendant equipment, which does, however, have certain advantages over the simpler method.

Another contemplated possibility is to provide a separate source of pulsed electric power feeding the main power leads 2 and 3. This would eliminate the maintenance of numerous pulsing contacts in a large installation. Additional simplification for some applications could be gained by using similar voltages on all of the supply circuits, and using apparatus of appropriate rating.

For engineering reasons, the "item," "category," and "clearing" switch buttons are used to actuate the "item," "category," and "clearing" relays respectively which, in turn, actuate their respective combinations of contacts; however, for still further simplification in some applications, the switch buttons could directly operate the required combinations of contacts without the intervening relays. Such an arrangement would obviously eliminate the first pair of main conductors and the control circuits as shown in Fig. 2.

The above disclosure, involving an initial application of our invention to the dispatching of taxi-cabs, is for illustrative and explanatory purposes only, and to clearly and understandably set forth the principles and methods used therein. Therefore, no limitations are thereby implied, and the appended claims should be construed as broadly as the state of the art permits.

Having thus described our invention, we claim:

1. In an electro-mechanical registry system, in combination: a first pair of electrical conductors adapted to receive energy from an electric power source; a plurality of control circuits connected in parallel between said first conductors; the first of said control circuits comprising a manually controllable normally open "clearing" switch and a "clearing" relay coil serially connected; said "clearing" relay coil adapted to actuate at least one pair of normally closed contacts; a second of said control circuits including a pair of normally closed "clearing" relay contacts and an "item" relay coil serially connected to a manually controllable normally open "item" switch in parallel with a pair of normally open "item" relay "locking-in" contacts; said "item" relay coil adapted to actuate a plurality of normally open contacts; a third of said control circuits including a pair of normally closed "clearing" relay contacts, a manually operable normally open "category" switch, and a "category" relay coil serially connected, plus a "locking-in" circuit connected in parallel with said "category" switch and comprising a pair of normally open "clear interlock" relay contacts, a plurality of single-pole double-throw "category" relay switching means, and a first pair of normally open "category" relay contacts serially connected; said "category" relay coil adapted to actuate a plurality of normally open contacts and a plurality of single-pole double-throw switching means; a second pair of electrical conductors adapted to receive energy from an electric power source; a plurality of indicating circuits connected in parallel between said second conductors; the first of said indicating circuits including a second pair of normally open "item" relay contacts, selective switching means, and one of a first plurality of individually selectable "category" indicating means serially connected; a second of said indicating circuits including "item" indicating means, selective switching means, a pair of a plurality of individually selectable pairs of normally open "category" relay contacts, and "current-to-voltage" conversion means serially connected; a third of said indicating circuits including selective switching means, and one of a second plurality of individually selectable "category" indicating means serially connected; a third pair of electrical conductors adapted to receive energy from an electric power source; a plurality of actuating circuits connected in parallel between said third conductors; at least one of said actuating circuits including a third pair of normally open "item" relay contacts, a pair of normally closed "stepping" relay contacts, a "stepping" relay coil, selective switching means, a pair of normally closed "category" relay contacts, and a group of at least two parallel pairs of normally open "category" relay contacts all serially connected; said "stepping" relay coil adapted to actuate a pair of normally closed contacts; a "link" circuit including said "current-to-voltage" conversion means and a "clear interlock" relay coil; and said "clear interlock" relay coil adapted to actuate the aforementioned "clear interlock" relay contacts.

2. In an electro-mechanical registry system, in combination: a bank of manually controllable item switches each having a plurality of normally open contacts; a bank of manually controllable category switches each having a plurality of normally open contacts and single-pole double-throw switching means; a first pair of electrical conductors adapted to receive energy from an electric power source; a plurality of indicating circuits connected in parallel between said first conductors; the first of said indicating circuits including a pair of normally open item switch contacts, selective switching means, and one of a first plurality of individually selectable category indicating means serially connected; a second of said indicating circuits including item indicating means, selective switching means, and a pair of a plurality of selectable normally open category switch contacts serially connected; a second pair of electrical conductors adapted to receive pulsing energy from an electric power source; a plurality of actuating circuits connected in parallel between said second conductors; at least one of said actuating circuits including a second pair of normally open item switch contacts, a pulsing relay coil, selective switching means, a pair of normally closed category switch contacts, and a group of at least two parallel pairs of normally open category switch contacts all serially connected; and said pulsing relay coil adapted to actuate said selective switching means.

3. In a posting system for registering a plurality of items in a plurality of categories, in combination: a first bank of manually controllable electric switches, each representing an item and each having a plurality of contacts; a first bank of electro-responsive annunciating means, each member of said bank representing an item; a second bank of manually controllable electric switches, each representing a category and each having a plurality of contacts; a second bank of electro-responsive annunciating means, each member in said bank representing a category; a bank of electro-responsive posting devices including a plurality of multi-position switching means, each of said devices representing an item, each of which devices is selectively settable to a plurality of different positions for registering an item in various categories, each position representing a different category, said posting devices collectively cataloging all items; a plurality of electric actuating circuits for selectively setting each of said posting devices individually to any desired position; a first group of electric annunciating circuits cooperatively associated with first switching means included in said posting devices and said first bank of annunciating means for indicating all items registered in any particular category; a second group of electric annunciating circuits cooperatively associated with second switching means included in said posting devices and said second bank of annunciating means for indicating in which category a particular item has been registered.

4. In a registry system for recording the location of a plurality of objects which may be disposed in various zones of a plural zone area; display means including a first bank of annunciators individually corresponding to said objects, and a second bank of annunciators individually corresponding to said zones; a control console including a first bank of manually operative switch keys individually corresponding to said objects, and a second bank of manually operative switch keys individually corresponding to said zones; a bank of registry switches individually corresponding to said objects, and each of said registry switches having a terminal position for each of said zones; electric circuits adapted to actuate all annunciators representing objects recorded in the same zone upon the operation of the switch key representing that zone through the medium of said registry switches; electric circuits adapted to actuate the annunciator representing a given zone by any of the switch keys representing objects registered in said given zone through the medium of said registry switches; said registry switches adapted to be individually actuated by the simultaneous operation of two switch keys, one in each of said two banks of switch keys; and testing circuits adapted to apply electric energy to all annunciators to verify normal performance.

5. In a registry system for recording the location of a plurality of objects which may be disposed in various zones of a plural zone area; display means including a first bank of annunciators individually corresponding to said objects, and a second bank of annunciators individually corresponding to said zones; a control console including a first bank of manually operative switch keys individually corresponding to said objects, and a second bank of manually operative switch keys individually corresponding to said zones; a bank of registry switches individually corresponding to said objects, and each of said registry switches having a terminal position for each of said zones; electric circuits adapted to actuate all annunciators representing objects recorded in the same zone upon the operation of the switch key representing that zone through the medium of said registry switches; electric circuits adapted to actuate the annunciator representing a given zone by any of the switch keys representing objects registered in said given zone through the medium of said registry switches; and said registry switches adapted to be individually actuated by the simultaneous operation of two switch keys, one in each of said two banks of switch keys.

6. In a posting system of the character described in combination a first bank of annunciators, each representing an item; a second bank of annunciators, each representing a category; a first bank of control switches, each representing an item; a second bank of control switches, each representing a category; a bank of sequential switching devices, each device representing an item, and each circuit configuration within any one of said switching devices representing a category in which the item represented by said switching device has been cataloged; said annunciators in said first bank adapted to be actuated by electric control switches in said second bank through the medium of said sequential switching devices; annunciators in said second bank being adapted to be actuated by control switches in said first bank through the medium of said sequential switching devices; said sequential switching devices adapted to be actuated through the combined operation of control switches in said first and second banks; a third bank of annunciators, each representing a category; and said third bank of annunciators, through the medium of said sequential switching devices, adapted to indicate those categories having at least one item posted therein.

7. In a posting system of the character described in combination a first bank of annunciators, each representing an item; a second bank of annunciators, each representing a category; a first bank of control switches, each representing an item; a second bank of control switches, each representing a category; a bank of sequential switching devices, each device representing an item, and each circuit configuration within any one of said switching devices representing a category in which the item represented by said switching device has been cataloged; said annunciators in said first bank adapted to be actuated by electric control switches in said second bank through the medium of said sequential switching devices; annunciators in said second bank being adapted to be actuated by control switches in said first bank through the medium of said sequential switching devices; and said sequential switching devices adapted to be actuated through the combined operation of control switches in said first and second banks.

8. In a posting system of the character described in combination a first bank of annunciators, each representing an item; a second bank of annunciators, each representing a category; a first bank of control switches, each representing an item; a second bank of control switches, each representing a category; electric circuits adapted to lock-in and retain indications displayed by said annunciators; an electric circuit adapted to render said lock-in circuits inoperative and thereby remove indications displayed by said annunciators; a bank of sequential switching devices, each device representing an item, and each circuit configuration within any one of said switching devices representing a category in which the item represented by said switching device has been cataloged; said annunciators in said first bank adapted to be actuated by electric control switches in said second bank through the medium of said sequential switching devices; annunciators in said second bank being adapted to be actuated by control switches in said first bank through the medium of said sequential switching devices; and said sequential switching devices adapted to be actuated through the combined operation of control switches in said first and second banks.

WILLIAM A. SOURWINE.
HERBERT I. PIERCE.

REFERENCES CITED

The following references are of record in the file of this patent:

UNITED STATES PATENTS

| Number | Name | Date |
| --- | --- | --- |
| 1,308,958 | McFell | July 8, 1919 |
| 1,927,362 | Ekman | Sept. 19, 1933 |
| 1,964,047 | Foss | June 26, 1934 |
| 2,330,355 | Hershey | Sept. 28, 1943 |
| 2,397,881 | Nitterauer | Apr. 7, 1946 |